Patented Aug. 29, 1933

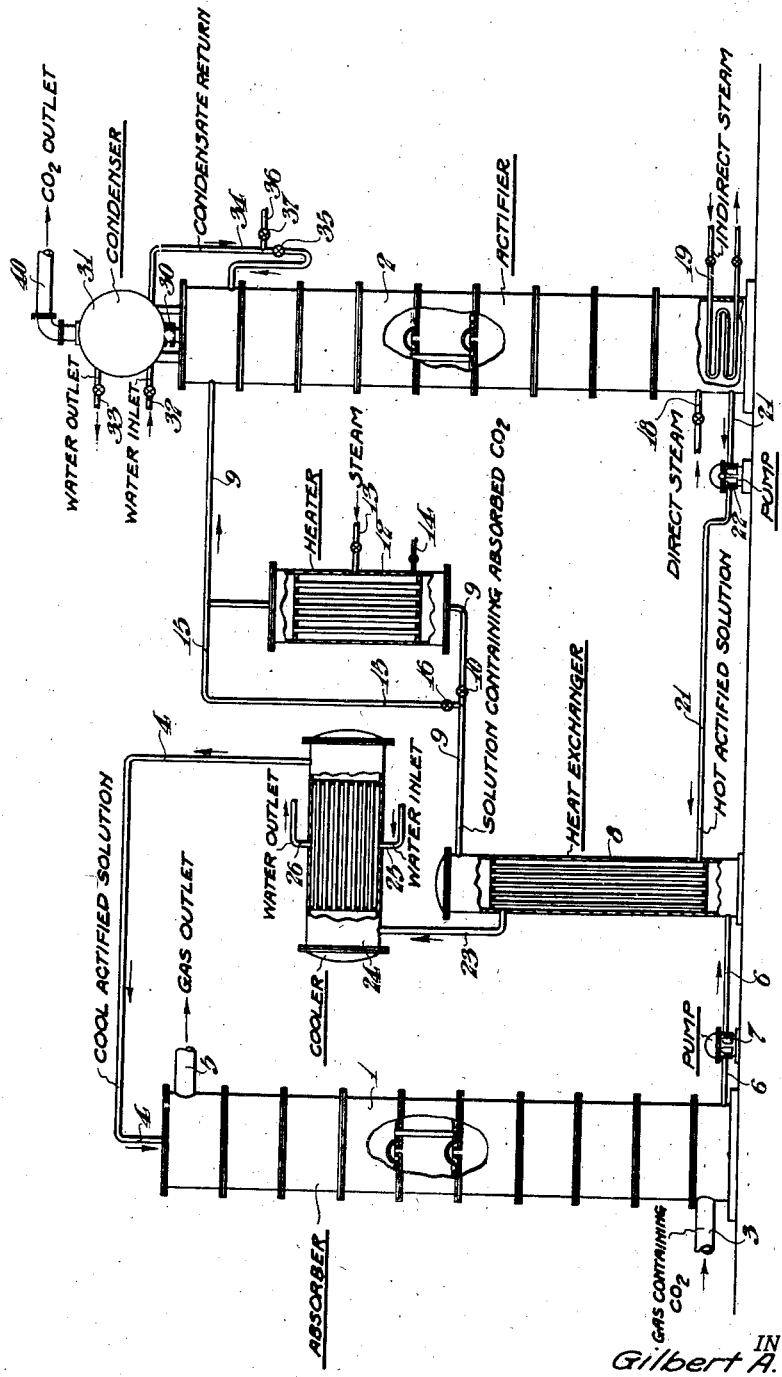

1,924,178

UNITED STATES PATENT OFFICE 1,924,178

METHOD OF OBTAINING PURE CARBON DIOXIDE

Gilbert A. Bragg, Pittsburgh, Pa., assignor to The Koppers Company of Delaware, a Corporation of Delaware Application September 9, 1931. Serial No. 561,878

3 Claims. (Cl. 23—150)

This invention relates to a method of obtaining carbon dioxide in substantially pure form from a source in which the carbon dioxide is present in admixture with other gases or impurities.

My invention has for an object the provision of a method of the character set forth in which carbon dioxide may be obtained in substantially pure form in a novel, simple and efficacious manner, and has for further objects such other operative advantages and results as may hereinafter be found to obtain.

I have found that if gases of combustion or other gaseous mixtures containing carbon dioxide, and preferably having a content of 10% or more of carbon dioxide and containing no appreciable amounts of other acidic gaseous substances such as $H_2S$ and $SO_2$, are subjected to contact with a solution of an alkali metal salt of a weak acid, the solution will selectively absorb carbon dioxide. If the carbon dioxide-laden solution is then removed from the gas and heated as, for example, by means of direct or indirect steam, the carbon dioxide is driven off in substantially pure form except as to water vapor, which may be removed by condensation.

I, therefore, treat a source of gaseous carbon dioxide containing, for example 20% of $CO_2$ but no appreciable amounts of other acidic gaseous substances, with such a solution, then remove the solution from contact with the gas, heat it to drive off the absorbed carbon dioxide and collect the substantially pure $CO_2$ thereby liberated, with condensation of water vapor therefrom if necessary.

I have found that a solution of the above character, after removal of $CO_2$ previously absorbed, is capable of further absorption of $CO_2$ and consequently I have found it advantageous to employ a solution of the character recited above in a cyclic and preferably continuous manner and with appropriate heat exchange and cooling operations to provide for a low temperature in the absorption stage of the cycle, thus promoting absorption of $CO_2$ in that stage.

Of the alkali metals, I prefer to use potassium for, although sodium may be successfully employed, the potassium compounds are in general more soluble and may be used in greater concentrations, thus reducing the amount of solution necessary to effect the recovery of a given amount of $CO_2$, the size of the apparatus and the general cost.

The alkali metal salts which I employ are, as stated above, the salts of weak acids, such as borates, phenolates, salicylates and phosphates, and of these the borates are preferred as having special advantages.

The concentrations employed are in general as high as possible without being so high as to cause troublesome precipitation of salts from the solution. A suitable solution, for example, would be a solution containing 10% by weight of potassium borate prepared, for example, by dissolving boric acid in a solution of potassium hydroxide or vice versa.

In order that my invention may be clearly exemplified, I now describe with reference to the accompanying drawing a preferred manner in which my invention may be practiced and embodied. In this drawing, The single figure is a more or less diagrammatic elevational view of apparatus suitable for the recovery of substantially pure carbon dioxide according to the method of my invention.

Referring to the drawing, it will be seen that the principal apparatus elements are an absorber 1 and an actifier 2. These elements are shown as conventional bell-and-tray type columns arranged for counterflow of gas and liquid, but it will be obvious that other types of gas and liquid contact apparatus may be employed and that concurrent flow apparatus may be substituted for counterflow apparatus wherever desirable.

In the present instance, a gas containing carbon dioxide but no appreciable amount of other acidic gaseous constituents is admitted to the bottom of the absorber 1 through an inlet 3 and passes upward through the absorber 1 in countercurrent to the flow of the absorbent solution which is admitted through a conduit 4 at the top of the absorber 1. During the flow of the gas upward through the absorber 1, carbon dioxide is absorbed therefrom by said absorbent solution. The residual gas leaves the top of the absorber 1 through an outlet 5.

The absorbent solution which, as recited hereinabove, contains potassium borate or other alkali metal salt of a weak acid, passes downward through the absorber 1. Upon reaching the bottom of the absorber 1, the solution containing carbon dioxide absorbed from the gas is withdrawn through a conduit 6 and delivered by a pump 7 to a heat exchanger 8 where it absorbs heat from the hot actified solution leaving the actifier 2, as will be described hereinbelow.

The heated solution then passes through a conduit 9 having a valve 10 and an indirect heater 12 to the upper portion of the actifier 2. The heater 12 and the conduit 9 are provided with a valved inlet 13 for the admission of a heating fluid, such as steam, and may also be provided with a valved condensate drain pipe 14.

If sufficient heating of the solution has been accomplished in the heat exchanger 8, all or a portion of the solution instead of being passed through the heater 12, may be by-passed around the latter through a conduit 15 having a valve 16.

The solution containing carbon dioxide absorbed from the gas in the absorber 1 then passes downward through the interior of the actifier 2. Heat is meanwhile supplied to the solution either through a direct steam inlet 18 or indirect steam coil 19, which are provided in the actifier 2 for that purpose or by means of any other suitable heating device or method.

Whether direct or indirect steam is used, the solution is brought to its boiling point or a little below the same and maintained at such temperature until the carbon dioxide removed from the gas in the absorber 1 is in turn removed from the solution to the desired extent.

The hot actified solution is then withdrawn from the bottom of the actifier 2 through a conduit 21 by means of a pump 22 and is delivered to the indirect heat exchanger 8 where, as above noted, it is brought into indirect contact with the solution leaving the absorber 1 and gives up a considerable portion of its heat to the latter.

The thereby partially cooled actified solution then passes through a conduit 23 to an indirect cooler 24 of suitable type which may be provided with conduits 25 and 26 for the admission and removal respectively of water or other cooling medium. Cooled actified solution then passes through the cooler 24 through the conduit 4 into the absorber 1, thus completing its cycle.

The cooler 24 may be omitted when so desired, as may also the heat exchanger 8, when the absorption stage is desired to be maintained at a temperature above atmospheric. Such absorption temepratures may be of the order of from 40° C. to 50° C., or even higher, although lower temperatures are preferred in most cases.

During the actification of the solution in the actifier 2, the carbon dioxide removed by the solution in the absorber 1 is largely volatilized and passes out of the actifier 2 through an outlet 30 located at or near the top thereof. The gas passing out through the conduit 30 may contain considerable amounts of steam but otherwise comprises substantially pure carbon dioxide.

Where direct steam has been employed for heating the solution in the actifier 2, it is not suitable to return this steam in condensed form to the solution, but where indirect steam has been employed for heating, it may be desirable to condense and return this steam to the solution in order to prevent loss of the latter by evaporation. In any event, for the purpose of condensing the steam, there is provided a condenser 31 having conduits 32 and 33 for the admission and removal, respectively, of a cooling medium such as water.

The carbon dioxide gas passing through the condenser 31 is cooled below the condensing point of steam. The aqueous condensate may be returned to the actifier 2 through a sealed conduit 34 having a valve 35, or where the return of this condensate to the actifier 2 is not desired, it may be drawn off through a conduit 36 having a valve 37.

The substantially pure carbon dioxide gas leaves the condenser 31 through a conduit 40 and is collected for use in any suitable manner, the apparatus for this purpose being conventional and not shown on the drawing.

Where the gases comprising a source of carbon dioxide initially contain acidic substances such as $H_2S$ or $SO_2$ which would interfere with the present process, such substances may be removed from the gas prior to the entry of the gas in the absorber 1 by washing the gas with a solution of sodium bicarbonate, or by any other suitable method.

It will be obvious to those skilled in the art that the apparatus shown and described by way of illustrative example is more or less conventional in detail and is susceptible of considerable modification, and while it is a preferred form, my method is not to be limited to the use of this particular form of apparatus.

It will further be obvious to those skilled in the art that the actual concentrations, rate of recirculation in the solution, temperatures and pressures are best judged by the operator in accordance with the particular problem dealt with in each case and need not be recited in further detail here. Consequently, my invention is not limited to any operative details described hereinabove except as it may be so limited by the claims hereinafter made.

I claim as my invention:

1. The method of obtaining carbon dioxide in substantially pure form, which comprises washing a gas containing at least 10% of carbon dioxide but no appreciable amounts of other acidic gaseous substances with a solution containing an alkali metal salt of boric acid and thereby selectively absorbing carbon dioxide from the gas, removing the carbon dioxide-laden solution from the gas, heating it to drive off carbon dioxide therefrom, and collecting the carbon dioxide thereby liberated.

2. The method of obtaining carbon dioxide in substantially pure form, which comprises washing a gas containing at least 10% of carbon dioxide but no appreciable amounts of other acidic gaseous substances with a solution containing a potassium borate and thereby selectively absorbing carbon dioxide from the gas, removing the carbon dioxide-laden solution from the gas, heating it to drive off carbon dioxide therefrom, and collecting the carbon dioxide thereby liberated.

3. The method of obtaining carbon dioxide in substantially pure form, which comprises washing a gas containing at least 10% of carbon dioxide but no appreciable amounts of other acidic gaseous substances with a solution containing a sodium borate and thereby selectively absorbing carbon dioxide from the gas, removing the carbon dioxide-laden solution from the gas, heating it to drive off carbon dioxide therefrom, and collecting the carbon dioxide thereby liberated.

GILBERT A. BRAGG.